Jan. 10, 1928. 1,655,665
J. L. SHROYER
ELECTRIC WAFFLE IRON
Filed Aug. 2, 1926
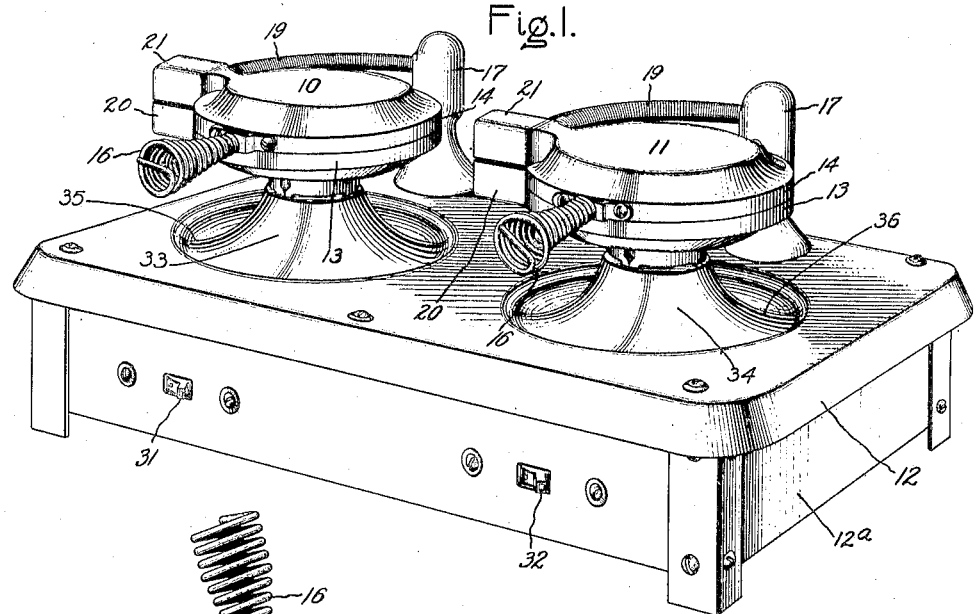
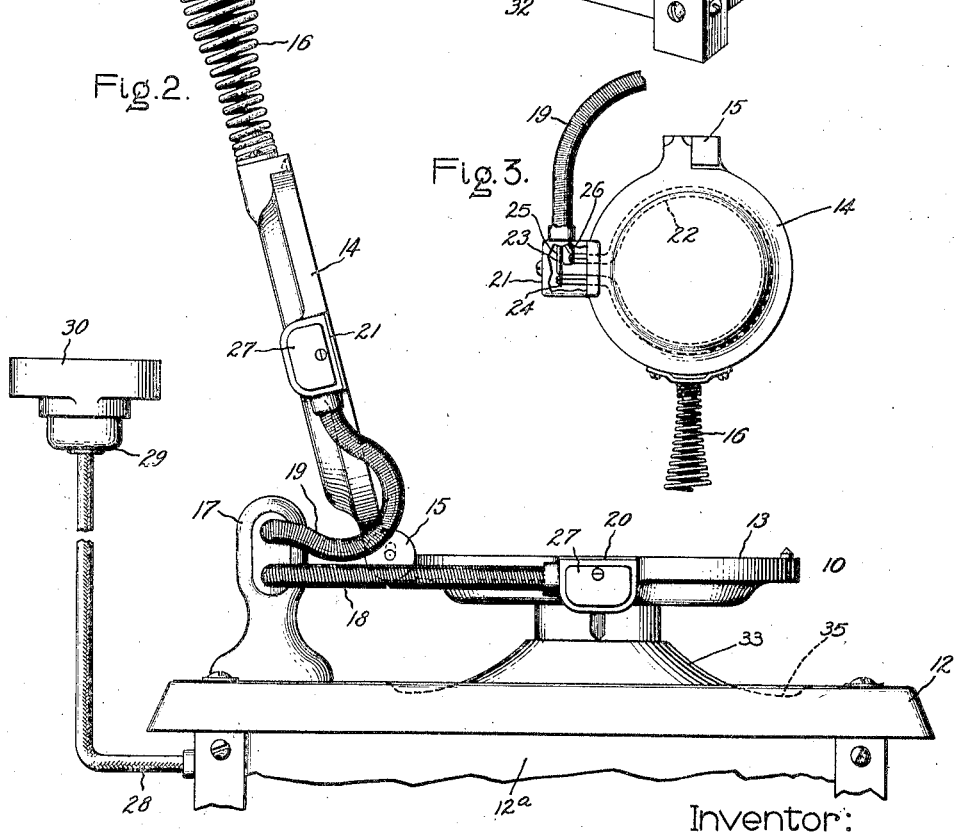
Inventor:
Jacob L. Shroyer,
by
His Attorney.

Patented Jan. 10, 1928.

1,655,665

UNITED STATES PATENT OFFICE.

JACOB L. SHROYER, OF OAK PARK, ILLINOIS, ASSIGNOR TO EDISON ELECTRIC APPLIANCE COMPANY, INCORPORATED, OF CHICAGO, ILLINOIS, A CORPORATION OF NEW YORK.

ELECTRIC WAFFLE IRON.

Application filed August 2, 1926. Serial No. 126,437.

My invention relates to electric waffle irons, and has for its object the provision of a simple, reliable, and inexpensive electric waffle iron.

My invention has especial reference to the electrical connections for the pivoted cooking plate. In carrying out my invention in one form I make the electrical connections at the side of the cooking plate and carry the conducting leads through a flexible conduit which terminates in a connection box adjacent the pivot axis of the plate. My invention also comprehends a specially constructed base plate for the waffle whereby a recess is formed.

For a more complete understanding of my invention, reference should be had to the accompanying drawing in which Fig. 1 is a perspective view of an electric waffle iron embodying my invention; Fig. 2 is an end elevation of the device shown in Fig. 1; while Fig. 3 is a fragmentary plan view to a reduced scale showing details of construction.

Referring to the drawing, I have shown my invention in one form as embodied in so-called "heavy-duty" waffle iron apparatus, such as used in hotels and restaurants. One or more complete waffle irons may be mounted on a common support, and as shown in Fig. 1 two waffle irons 10 and 11 are mounted on a base plate 12 resting on a framework 12$^a$. Each waffle iron comprises a lower stationary cooking plate 13 which is secured to the base plate 12, and an upper cooking plate 14 which is secured to the plate 13 by means of a hinged joint 15 at the rear. On the front side of the pivoted plate 14 is a suitable handle 16 by means of which the plate can be raised and lowered in a well known manner. Fig. 1 shows the upper plate in lowered position, while Fig. 2 shows it in a raised position.

The two plates 13 and 14 are each provided with suitable electric heating units, and the electrical connections for the heating units of each waffle iron are made through a terminal box or connection post 17 which is secured to the base plate 12 just behind the hinged joint 15 of each waffle iron. Electrical conductors are led up from the interior of the support 12$^a$ into the connection post 17, and from the connection post 17 the conductors are led out through flexible conduits 18 and 19 to the plates 13 and 14 respectively. The conduits 18 and 19, which are preferably metallic, terminate in connection boxes 20 and 21 secured to the waffle iron plates at one side, that is, at points 90° removed from the hinged connection 15. It will be observed that the connection post 17 is of such height that the conduit 18 is substantially horizontal, the conduit 19 being also substantially horizontal when the waffle iron is closed.

As shown, the two plates 13 and 14 are made of cast metal, such as aluminum, a suitable electric heating unit 22 being cast in each plate. It will be understood that the adjacent surfaces, that is, the cooking surfaces of the two plates, are provided with a suitable design such as commonly used with waffle iron molds. The heating unit 22 is preferably of a sheathed type, such as described and claimed in Patent No. 1,367,341 to Abbott dated February 1, 1921. This unit is particularly suitable for being cast in the part to be heated. The single length of the sheathed heating unit may be bent in circular form, as indicated in Fig. 3, and cast in each plate, the position of the heating unit with respect to the periphery of the plate and the distribution of the metal being such that a substantially uniform distribution of heat is obtained on the cooking surface of the waffle iron plate. The connection boxes 20 and 21 may also be cast integral with the plates, and the heating unit 22 is so positioned in each plate that its terminals 23 and 24 extend out at the side of the plate into the connection box where electrical connection is made with insulated conductors 25 and 26 respectively, extending through the flexible conduit. A removable plate 27 is provided on each connection box whereby access may be had to the terminals of the heating unit.

It will be understood that each one of the waffle irons mounted on the support 12 is electrically connected in the manner previously described, the connections for the two plates of each waffle iron also being similar. A suitable insulated twin conductor 28 leads into the framework 12$^a$ to the electrical connections extending to the posts 17, and on its outer end this conductor 28 is provided with a suitable quick attachment connection, such as a plug 29, whereby it may be connected to a plug receptacle 30. Preferably switches 31 and 32 are provided on the front of the framework 12ª for the two waffle irons whereby they may be independently operated. These switches, it will be understood, are included in the connections leading to the respective posts 17 of the two waffle irons.

With this arrangement it will be observed that the upper plate 14 may be freely opened and closed during the cooking operations, the flexible conduit 19 bending when the upper plate is lifted, as indicated in Fig. 2. This system of connections for the two plates makes possible a very simple and rugged construction. All electrically conducting parts are furthermore completely covered and protected from grease, water, etc., and the waffle iron may be very easily cleaned.

It will be understood that the connection posts 17 may be arranged in various positions on the base plate 12, the essential feature of my invention being the location of the bearing posts near the respective pivot axes of the upper cooking plates. In other words, instead of being placed directly behind the hinges, the posts may be placed at the side of the hinge but near the pivot axes.

Another feature of my invention is the arrangement of the base plate 12. This plate is preferably formed from sheet iron or steel. It is suitably shaped, as by stamping in dies, to have two integral circular pedestals 33 and 34 on which the fixed cooking plates 13 are secured. Around the bases of the pedestals, depressions or recesses 35 and 36 are formed. These depressions have greater diameters than the cooking plates and are provided to catch any batter, grease, etc., which may be spilled from the waffle iron plates.

While I have described my invention as embodied in concrete form and as operating in a specific manner in accordance with the provisions of the patent statutes, it should be understood that I do not limit my invention thereto, since various modifications thereof will suggest themselves to those skilled in the art without departing from the spirit of my invention, the scope of which is set forth in the annexed claims.

What I claim as new and desire to secure by Letters Patent of the United States is:

1. An electric waffle iron comprising a base, a pedestal support on said base, a stationary cooking plate mounted on said support, a pivoted cooking plate cooperating with the first, electric heating means for said pivoted plate, a connection post on said base extending upward therefrom in spaced relation with said support, a flexible conduit leading from said post to said pivoted plate, and electrical connections in said conduit for said heating means, said conduit being arranged to flex to provide for movement of said pivoted plate.

2. An electric waffle iron comprising a base, a pedestal support on said base, a stationary cooking plate mounted on said support, a pivoted cooking plate cooperating with the first, electric heating means for said pivoted plate, an electric connection post on said base extending upward adjacent the axis of said pivoted plate in spaced relation with said support, a flexible conduit leading from said post to said pivoted plate, and electrical connections in said conduit for said heating means, said conduit being arranged to flex to provide for movement of said pivoted plate.

3. An electric waffle iron comprising a pair of cooperating cooking plates, a base, a pedestal support on said base to which one of said plates is secured, a pivotal connection between the other of said plates and the first, electric heating means for said pivoted plate, a connection post on said base extending upward adjacent said pivotal connection, a flexible conduit leading from said post to one side of said pivoted plate, and electrical connections in said conduit for said heating means, said conduit being arranged to flex to provide for movement of said pivoted plate.

4. An electric waffle iron comprising two cooperating cooking plates, a stand, a pedestal support on said stand to which one of said plates is secured, a pivotal connection between the second of said plates and the first, electric heating means for said plates, a connection post secured to said stand, a pair of conduits leading from said post to said plates respectively, and electrical connections for said heating units in said conduits, the conduit for said pivoted plate being arranged to flex to provide for movement of said pivoted plate.

5. An electric waffle iron comprising a pair of cooperating cooking plates, a stand, a support on said stand to which one of said plates is secured, a pivotal connection for the other plate, electric heating units for said plates, a connection post for said heating units secured to said stand adjacent said pivotal connection, electrical connections leading from said connection post in a substantially horizontal direction to said heating units, and metallic sheaths for said connections leading from said connection post to said plates respectively, the sheath leading to said pivoted plate being arranged to flex to provide for movement of said plate on its pivot.

6. An electric waffle iron comprising a base plate, a pedestal on said base plate forming an integral part thereof, a stationary cooking plate secured to said pedestal, a pivoted cooking plate cooperating with the first, electric heating means for said pivoted plate, a connection post on said base plate extending upward in spaced relation with said pedestal, a conduit arranged to flex upon movement of said pivoted plate extending from said post to said pivoted plate, said base plate being formed with a recess around said pedestal to receive the waste materials from said cooking plates.

In witness whereof, I have hereunto set my hand this 29th day of July, 1926.

JACOB L. SHROYER.